United States Patent
McMahan et al.

(10) Patent No.: US 9,471,453 B2
(45) Date of Patent: *Oct. 18, 2016

(54) MANAGEMENT OF TEST ARTIFACTS USING CASCADING SNAPSHOT MECHANISM

(71) Applicant: International Business Machines Corporation, Armonk, NY (US)

(72) Inventors: Paul F. McMahan, Durham, NC (US); Sachin P. Patel, Durham, NC (US); John P. Whitfield, Waltham, MA (US); David Colasurdo, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 408 days.

This patent is subject to a terminal disclaimer.

(21) Appl. No.: 14/071,887

(22) Filed: Nov. 5, 2013

(65) Prior Publication Data
US 2014/0059387 A1    Feb. 27, 2014

Related U.S. Application Data

(63) Continuation of application No. 12/482,749, filed on Jun. 11, 2009, now Pat. No. 8,607,152.

(51) Int. Cl.
*G06F 3/0481* (2013.01)
*G06F 9/44* (2006.01)
*G06F 11/263* (2006.01)
*G06F 11/36* (2006.01)

(52) U.S. Cl.
CPC .......... *G06F 11/263* (2013.01); *G06F 3/0481* (2013.01); *G06F 8/71* (2013.01); *G06F 11/3672* (2013.01); *G06F 11/3684* (2013.01); *G06F 11/3688* (2013.01); *G06F 9/4443* (2013.01)

(58) Field of Classification Search
CPC ...... G06F 3/0481; G06F 8/71; G06F 11/263; G06F 11/3672; G06F 11/3684; G06F 11/3688; G06F 9/4443
See application file for complete search history.

(56) References Cited

U.S. PATENT DOCUMENTS

| | | |
|---|---|---|
| 6,715,108 B1 | 3/2004 | Badger et al. |
| 8,151,248 B1 | 4/2012 | Butler et al. |
| 2004/0073890 A1 | 4/2004 | Johnson et al. |
| 2004/0107415 A1 | 6/2004 | Melamed et al. |
| 2005/0229159 A1 | 10/2005 | Haba et al. |

(Continued)

*Primary Examiner* — Eric J Bycer
(74) *Attorney, Agent, or Firm* — Schmeiser, Olsen & Watts LLP

(57) ABSTRACT

Described are an apparatus and method for managing test artifacts. A test plan is selected for a product having a plurality of test artifacts comprising one selected from a group consisting of an execution record and a product requirement. One of the test artifacts is selected for a snapshot at a current time. The snapshot includes a storage record that includes information associated with the selected test artifact and its relationship with other test artifacts at the current time. The snapshot of the selected test artifact is acquired. A current state of the selected test artifact is stored as an element of the snapshot. A current state of relationships of the selected test artifact to the other test artifacts is stored. A current state of the other test artifacts having a relationship with the selected test artifact is stored. A type of snapshot is determined, comprising cascading through artifacts of the test plan to capture all information and relationships associated with the test artifact, its child artifacts, and the group consisting of the execution record and the product requirement.

18 Claims, 5 Drawing Sheets

(56) References Cited

U.S. PATENT DOCUMENTS

| | | |
|---|---|---|
| 2006/0075303 A1 | 4/2006 | Ulrich et al. |
| 2007/0234328 A1 | 10/2007 | Wilson et al. |
| 2008/0184206 A1 | 7/2008 | Vikutan |
| 2008/0307345 A1 | 12/2008 | Hart et al. |
| 2009/0204591 A1* | 8/2009 | Kaksonen ............ G06F 11/3684 |

\* cited by examiner

MANAGEMENT OF TEST ARTIFACTS USING CASCADING SNAPSHOT MECHANISM

RELATED APPLICATIONS

This application is a continuation application claiming the benefit of the filing date of U.S. Pat. No. 8,607,152 issued on Dec. 10, 2013 and entitled "Management of Test Artifacts Using Cascading Snapshot Mechanism," contents of which are incorporated by reference herein in their entirety.

BACKGROUND

The invention relates generally to the field of quality assurance, and in particular to a method and system for managing development of a test plan for a software or hardware product.

SUMMARY

According to one embodiment of the invention, a method of managing test artifacts includes selecting a test plan for a product. A test plan is selected for a product. The test plan has a plurality of test artifacts comprising one selected from a group consisting of an execution record and a product requirement. One of the test artifacts is selected for a snapshot at a current time. The snapshot includes a storage record that includes information associated with the selected one of the test artifacts and the relationship of the selected one of the test artifacts with respect to other test artifacts at the current time. The snapshot of the selected test artifact is acquired. Acquiring the snapshot comprises storing a current state of the selected test artifact as an element of the snapshot storing a current state of relationships of the selected test artifact to the other test artifacts as an element of the snapshot; and storing a current state of the other test artifacts that have a relationship with the selected test artifact as an element of the snapshot. A type of snapshot is determined. Determining the type of snapshot comprises cascading through artifacts of the test plan to capture all information associated with the test artifact, its child artifacts, and the group consisting of the execution record defining the configuration of the product and the product requirement, and to further capture the selected test artifact's relationship with other test artifacts and its child artifacts.

According to another embodiment of the invention, a computer program product for managing test artifacts includes a computer readable storage medium that embodies computer readable program code. The computer readable program code includes computer readable program code configured to generate a user interface displaying at least one test plan having a plurality of test artifacts comprising one selected from a group consisting of an execution record and a product requirement. The user interface enables a user to select one of the displayed test plans. The computer readable program code of the computer readable storage medium also includes computer readable program code configured to enable the user to select a test artifact associated with a selected one of the displayed test plans and computer readable program code configured to acquire a snapshot of the selected test artifact, the snapshot including a storage record that includes information associated with the selected test artifact and the relationship of the selected test artifact with respect to other test artifacts at a current time. Acquisition of the snapshot includes storing a current state of the selected test artifact as an element of the snapshot; storing a current state of the relationships of the selected test artifact to the other test artifacts as an element of the snapshot; and storing a current state of the other test artifacts having a relationship with the selected test artifact as an element of the snapshot. Computer readable program code is configured to determine a type of snapshot, wherein determining that the type of snapshot is a snapshot of the test plan comprises cascading through artifacts of the test plan to capture all information associated with the test artifact, its child artifacts, and the group consisting of the execution record defining the configuration of the product and the product requirement, and to further capture the selected test artifact's relationship with other test artifacts and its child artifacts.

According to another embodiment of the invention, an apparatus for managing test artifacts includes a processing unit and a user interface including program code executed by the processing unit. The user interface enables a user to select a test plan for a product. The test plan has a plurality of test artifacts comprising one selected from a group consisting of an execution record and a product requirement. The user interface enables the user to select one of the test artifacts for which a snapshot is to be acquired. The snapshot includes a storage record that includes information associated with the selected one of the test artifacts and the relationship of the selected one of the test artifacts with respect to other test artifacts at a current time. Means for acquiring the snapshot of the selected test artifact, comprises means for storing a current state of the selected test artifact as an element of the snapshot; means for storing a current state of relationships of the selected test artifact to the other test artifacts as an element of the snapshot; and means for storing a current state of the other test artifacts that have a relationship with the selected test artifact as an element of the snapshot. The apparatus further comprises means for determining a type of snapshot, wherein determining that the type of snapshot is a snapshot of the test plan comprises cascading through artifacts of the test plan to capture all information associated with the test artifact, its child artifacts, and the group consisting of the execution record defining the configuration of the product and the product requirement, and to further capture the selected test artifact's relationship with other test artifacts and its child artifacts.

BRIEF DESCRIPTION OF SEVERAL VIEWS OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Development of a test plan implemented as part of a quality assurance process for a software or hardware product can be a significant challenge. Functions executed by the product must meet certain requirements. Thorough and rigorous testing are enforced so that the test results provide confidence that the product will function as intended. Test cases can be defined for use during execution of the test plan and the results used to demonstrate that the product meets the predetermined requirements.

Figure 1:
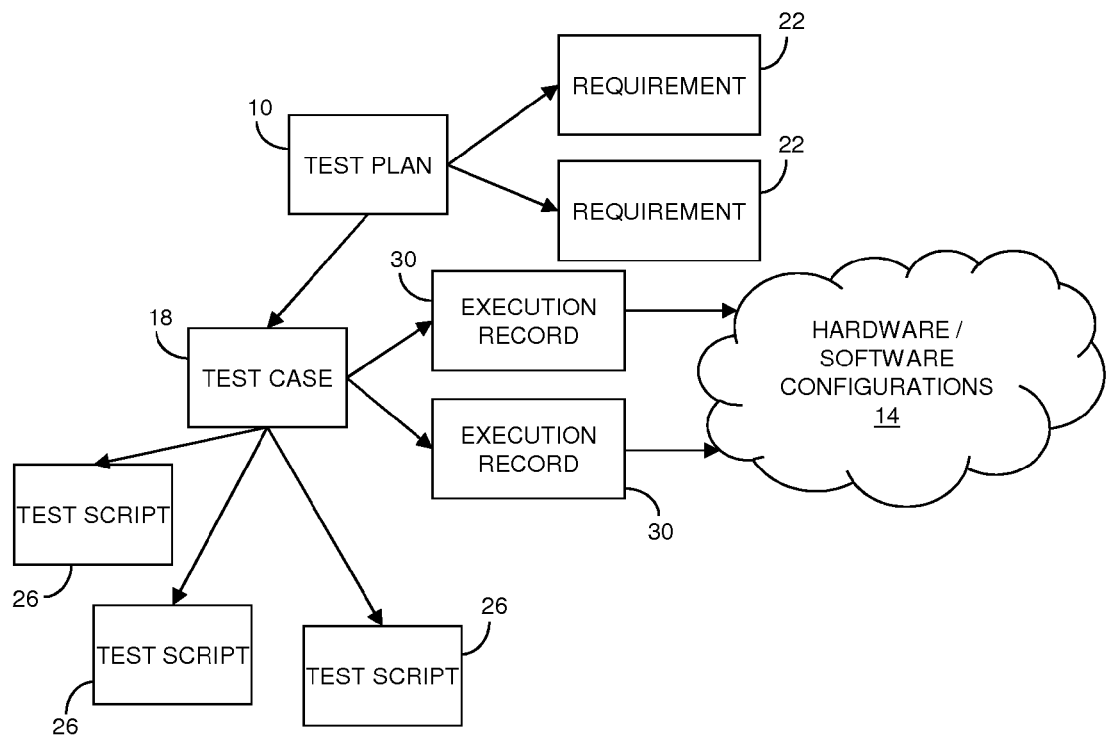
FIG. 1 illustrates the relationships among test artifacts of a test plan for testing a configuration or version of a hardware or software product.

FIG. 1 illustrates how various artifacts of a test plan 10 relate to the testing of a particular configuration or version 14 of a hardware or software product. The aggregation of test artifacts and the relationships defined among the artifacts include all the information about what is tested and how the tests are performed. One or more test cases 18 are defined to ensure that the product meets established product requirements 22. A test case 18 can have any number of test scripts 26 (i.e., executable programs) to cause certain functions to be executed in a specific manner. For example, structured query language (SQL) scripts may be created to load a database and the associated test cases 18 define the design and methodology for running the scripts. The test case 18 is executed for one or more configurations of the product as specified by one or more execution records 30. For example, an execution record 30 can associate or "map" to a specific product memory, firmware, power source and/or other hardware configuration parameters and settings. Often the total number of possible product configurations is too large to accommodate in a test plan with limited time. Thus the execution records 30 associated with the test cases 18 generally are selected to achieve a reasonable selection of all possible product configurations to meet time and cost constraints. Results for each execution record 30 are used to determine if the test case passed or failed for the corresponding configuration. Results from all test cases 18 are generally used to determine if the product is ready for sale and shipment.

The development of a test plan 10 typically requires a significant investment of time and effort. Requirements are identified and appropriate test cases 18 are determined. Often the time consumed in writing the test scripts 26 and entering data corresponding to all configuration parameters is significant. Thus the test plan 10 can be a major cost component in the overall product development cycle and may affect product availability.

Changes to a test plan 10 are often made after execution of the test plan 10 has started, that is, after some test results have been obtained. Typically, various versions of the test plan 10 are maintained throughout execution of the test plan 10 where a version is created for each change to the test plan 10. Conventionally, a new version of the test plan is stored after a number of changes are made to a test plan. In some instances, a new version is created every time a change made to the test plan. If a user wants to make use of different aspects of a particular version of the test plan, the user restores that version, in effect, replacing the current version with the prior version.

Figure 2:
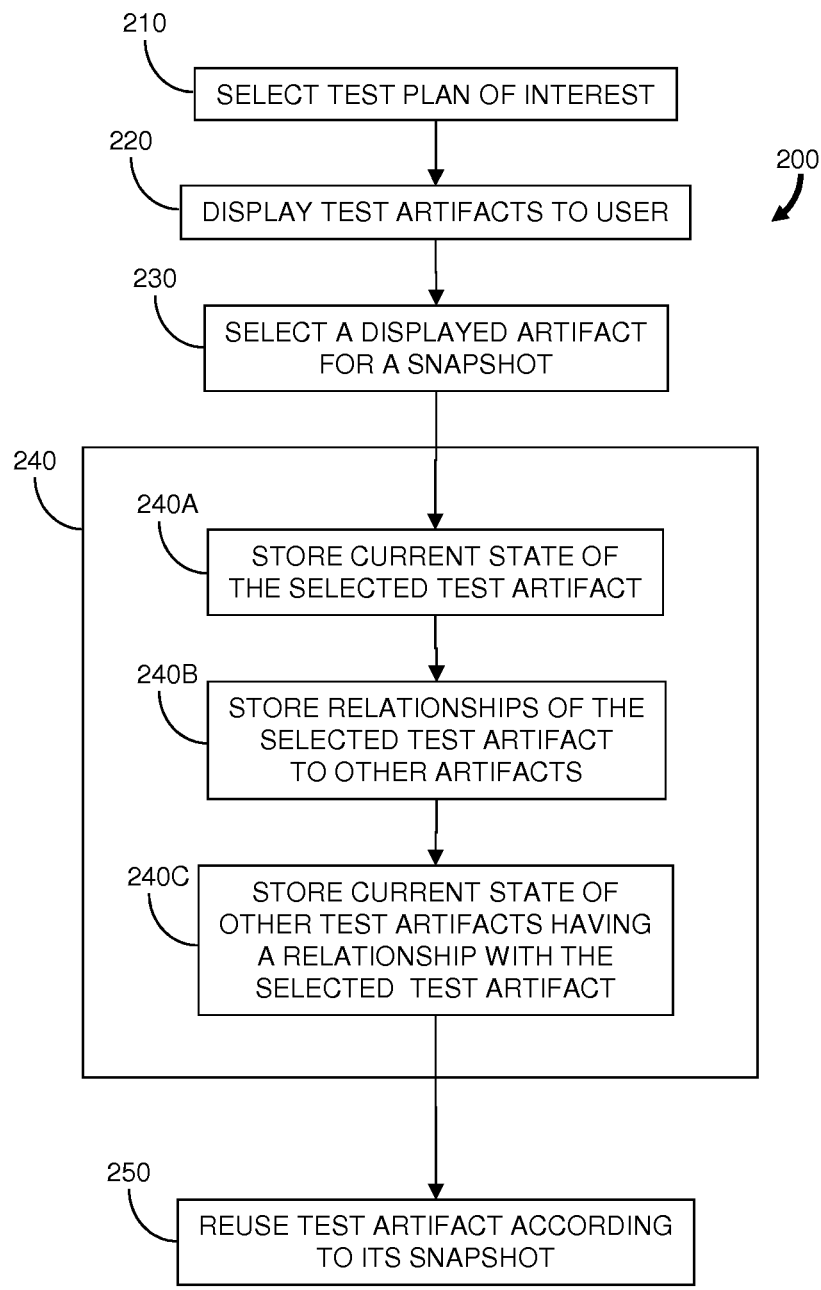
FIG. 2 is a flowchart representation of a method of managing test artifacts according to an embodiment of the invention.

Referring to FIG. 2, an embodiment of a method 200 of managing test artifacts such as those associated with a product test plan. According to the illustrated embodiment, a user selects 210 a test plan of interest. Test artifacts belonging to the test plan are displayed 220 to the user. Test artifacts include the test plan itself and can also include test cases, execution records defining different configurations of the product being tested, and product requirements. Generally test cases include one or more scripts for executing test functions. The user selects 230 a displayed test artifact for a snapshot, for example, through a user interface of a computing system or device. As used herein, a snapshot is a storage record that includes all the information associated with the test artifact and the relationships of the test artifact with respect to other test artifacts at a current time, that is, at the time the snapshot is performed. In response to the selection of the displayed test artifact, the current state of the selected test artifact, the relationships of the selected test artifact to the other test artifacts and the current state of the other test artifacts having a relationship with the selected test artifact are stored 240 as elements of the snapshot. Optionally, the test artifact is reused 250 according to the states and relationships stored for the snapshot, for example, to develop a subsequent test plan.

Acquiring a snapshot according to embodiments of the invention has significant advantages. A snapshot is easily initiated by a user through a single gesture executed through a user interface of a computing device. The snapshot includes a cascade effect in which the automatic storing of the state of test artifacts and the automatic storing of relationships defined among the test artifacts occurs. Thus snapshots can be used to maintain a read-only historical record of what was tested for a particular release of the test plan and the results of the tests for the release. Users can view information indicating the origin of the snapshot of a test artifact. Moreover, users can conveniently reuse previously defined test artifacts in subsequent test plans thereby reducing development time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
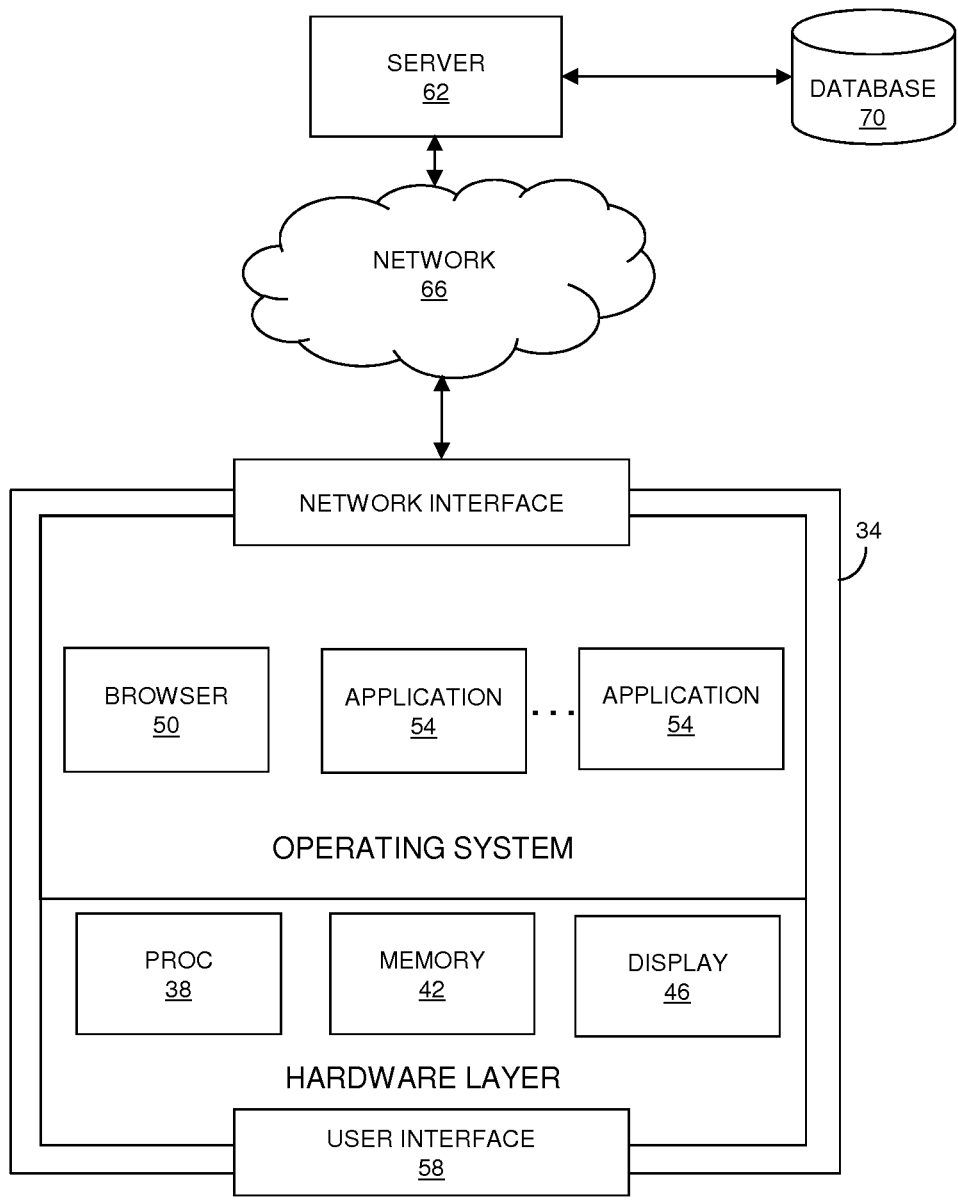
FIG. 3 is an illustration of a networked environment in which an embodiment of the method of the invention can be practiced.

FIG. 3 illustrates a networked environment in which an embodiment of the method of the invention can be practiced. The networked environment includes a client computing device or apparatus 34 having hardware components that include a processor 38, a memory 42 for persistent storage of data and software programs, and a display 46. The device 34 also includes an operating system that enables execution of a browser 50 and a number of applications 54 by the processor 38. The device 34 includes a user interface 58 having at least one input device (e.g., a keyboard, mouse, trackball, touchpad and/or touch-screen). Exemplary embodiments of the client computing system 10 include, but are not limited to, a personal computer (PC), a MACINTOSH™ computer, a workstation, laptop computer, a mainframe computer, a hand-held device such as a personal digital assistant (PDA) and a cellular phone. The client computing device 34 communicates with a server 62 through a network 66. By way of example, the network 66 can be a LAN, a WAN or the Internet. The server 62 includes a memory, a processor and an operating system (not shown) for storing data and for storing and executing software programs and applications.

In the illustrated embodiment, a user (e.g., a test planner or a test architect) interacts by way of the user interface 58 with a quality assurance (QA) management tool (i.e., QA management application) resident on the server 62. In one embodiment, the QA management tool comprises International Business Machine's RATIONAL QUALITY MANAGER™.

The server 62 is in communication with a database 70 and enables the writing of data records to the database 70 and the reading of data records from the database 70. The database 70 is configured to store test artifacts, including test scripts, execution records, test cases and product requirements for test plans. In addition, the database 70 stores data associated with snapshots of test plans as described in more detail below. The user interface 58 enables the user to view via the display 46 menu options and various parameters and identifiers associated with the test artifacts, and to enter various user inputs via the input device such as selections from displayed menu options.

Although the illustrated networked environment conforms generally to a client-server configuration, it should be recognized that other computing device configurations and network configurations are contemplated by the invention. For example, the server 62 may be absent and the QA management tool may reside locally on the computing device 34 in the form of a local software program or application.

As used herein, capturing a snapshot of a test artifact means collecting at a current time all the information associated with the test artifact and its relationship with other test artifacts. In effect, information and relationships for a selected test artifact and all its child artifacts are captured. Thus a snapshot of a test plan "cascades" through all the test artifacts of the test plan and captures information and relationships for all test artifacts that are part of the test plan. For example, a snapshot of a test plan captures all information and relationships for the product requirements, test cases, test scripts and execution records under the test plan. In another example, if a snapshot is captured for a test case, all information and relationships for the child artifacts of the test case (e.g., text scripts and execution records) are captured along with the relationship to the parent test plan; however, any relationships between the parent test plan and other test cases are not captured. In contrast to conventional file management techniques that employ backup systems to capture the state of various artifacts, snapshots enable the recording and preservation of relationships between the test artifacts, and the selective navigation of these relationships.

The snapshot has two significant advantages. First, the snapshot can be used to conveniently drive the execution and re-execution of the test plan. Thus it is possible to rerun the test plan at a later time with the test artifacts in their states at the time the snapshot was created. This capability is advantageous when the test plan is heavily automated or if the test plan is implemented on shared, time-sensitive resources. Second, snapshots can be acquired to form a read-only historical record that includes information on what was tested for a particular release and the corresponding test results. Thus the snapshots can be used as an audit trail that can be examined at a later time to see what scripts and configurations were tested.

Snapshots enable the captured state of all test artifacts in a test plan to be readily accessible from the current or "HEAD" state of each test artifact thereby enabling a previous state of a test artifact to be easily reused or examined.

Creation and Use of Snapshots

Significant time and effort can be invested in authoring, reviewing and finalizing the test artifacts in a test plan. Consequently, when all of the test artifacts are complete, reviewed and ready for use, the test architect enables a "snapshot mode" for the test plan. In this mode, the test architect creates a snapshot of the test plan.

Figure 4:
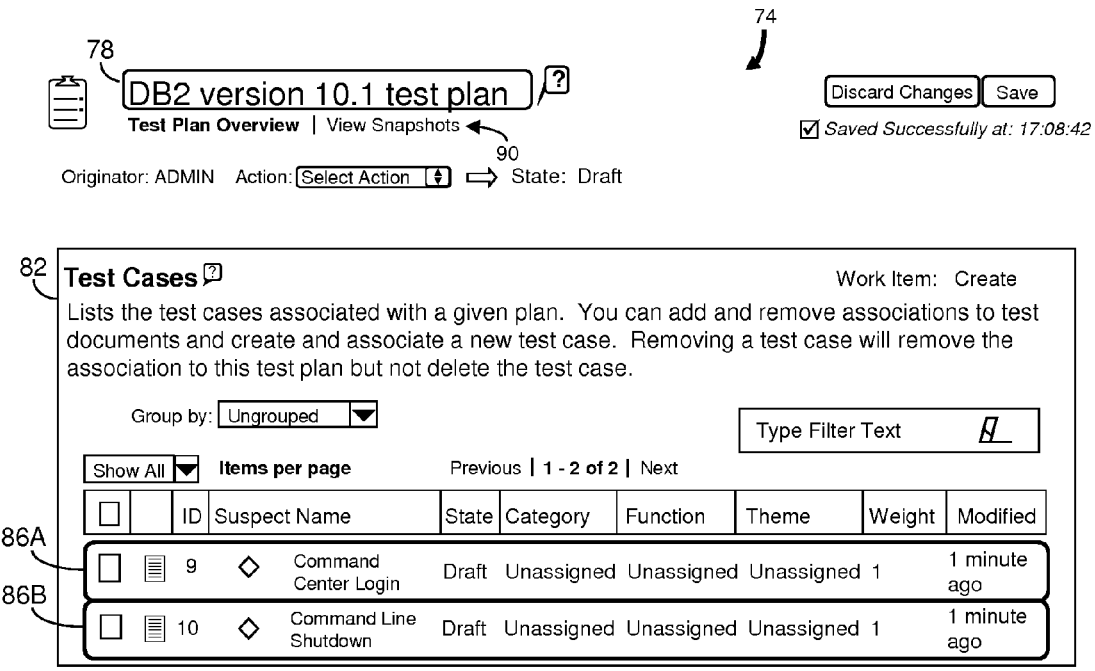
FIG. 4 illustrates a screen shot of a graphical user interface shown on the display of a computing device in response to the selection of a test plan.

FIG. 4 illustrates a screen shot of a graphical user interface (GUI) 74 presented via the display of the computing device to the user in response to the selection of a test plan. The GUI 74 is in a test plan overview mode which includes a descriptive name 78 "DB2 version 10.1 test plan" that uniquely identify the selected test plan and a section 82 listing the test cases 86A and 86B (generally 86) associated with the test plan. The first listed test case 86A is named "Command Center Login" and the second listed test case 86B is named "Command Line Shutdown."

Figure 5:
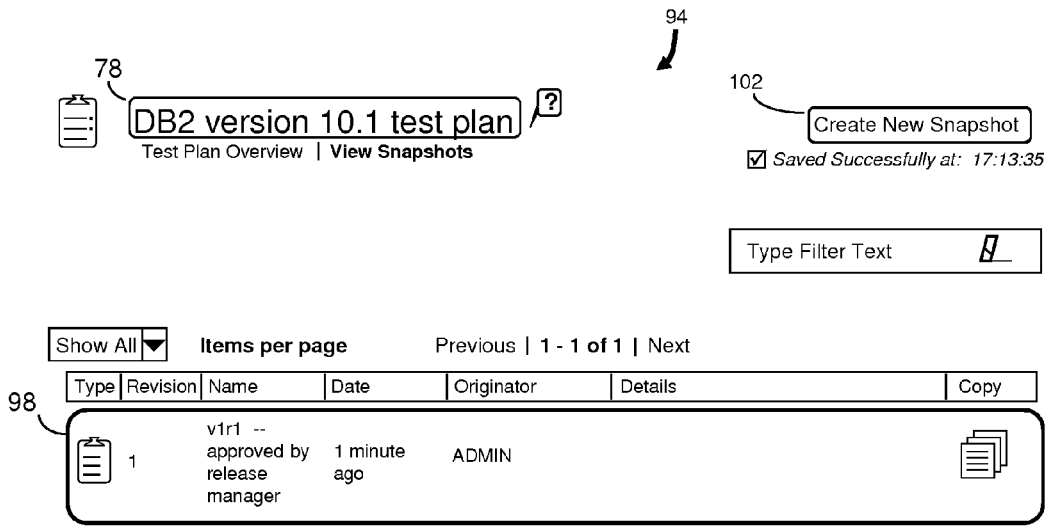
FIG. 5 illustrates a screen shot of a graphical user interface generated in response to a selection of the "View Snapshots" link in the graphical user interface of FIG. 4.

Selection of the "View Snapshots" link 90 in the GUI 74 changes the GUI as shown by the GUI 94 in the screen shot illustrated of FIG. 5. Changes to the test plan are not supported in this mode. The GUI 94 includes a listing of snapshots for the test plan. As illustrated, only one snapshot 98 named "v1r1—approved by release manager" has been captured. The user can select via a single user input gesture the "Create New Snapshot" link 102 to create a new (second) snapshot that captures the current state and relationships of all artifacts for the test plan.

Figure 6:
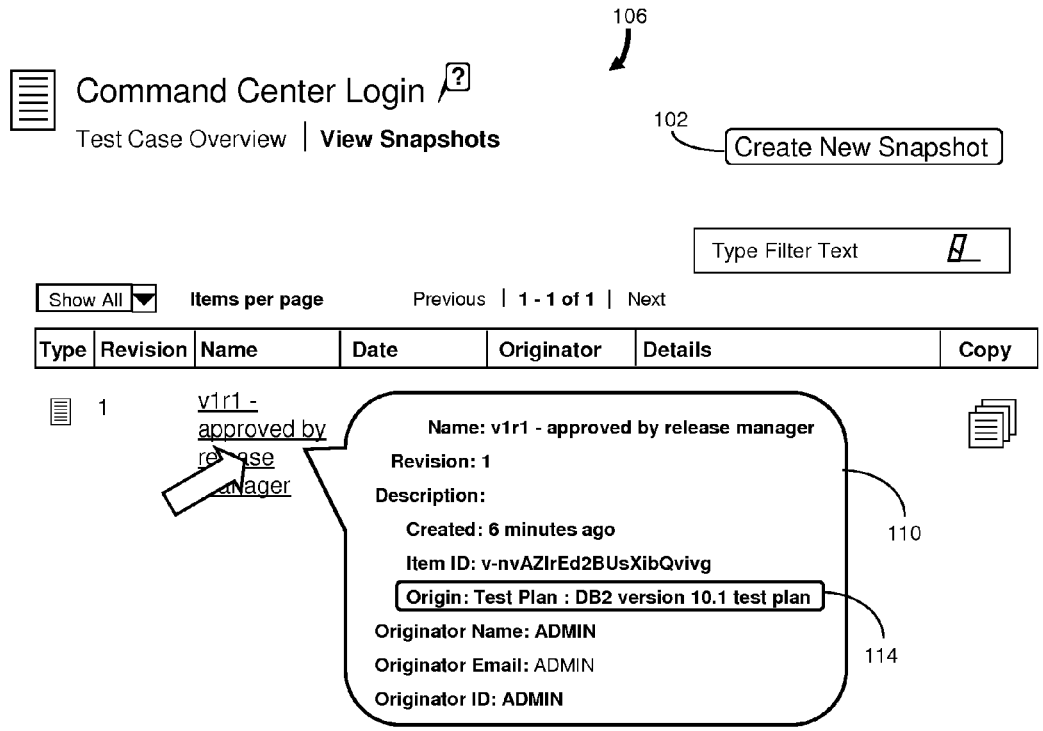
FIG. 6 illustrates a screen shot that includes a graphical user interface with a snapshot for the Command Center Login test case that is automatically created based on a cascading effect when the snapshot of the test plan is acquired.

FIG. 6 is an illustration of a screen shot that includes a GUI 106 showing a snapshot for the Command Center Login test case 86A that is automatically created according to the cascading effect when the snapshot of the test plan was performed. A snapshot (not shown) is similarly created for the Command Line Shutdown test case and other child test artifacts of the test plan when the test plan snapshot was performed. In response to a cursor hover or similar mouse input, the GUI 106 presents information 110 relating to the listed "v1r1—approved by release manager" snapshot. The information 110 includes an indication 114 of the origin of the cascade that resulted in the creation of the displayed snapshot. In other words, the snapshot of the Command Center Login test case 86A was not directly created but instead was created in response to the snapshot acquired for the "DB2 version 10.1 test plan." Although the origin indication links the Command Center Login test case to a particular test plan, it should be recognized that the same test case can also be used with a different test plan. In such an instance, a snapshot of the other test plan would result in a snapshot of the Command Center Login test case that would be linked to the other test plan.

Figure 7:
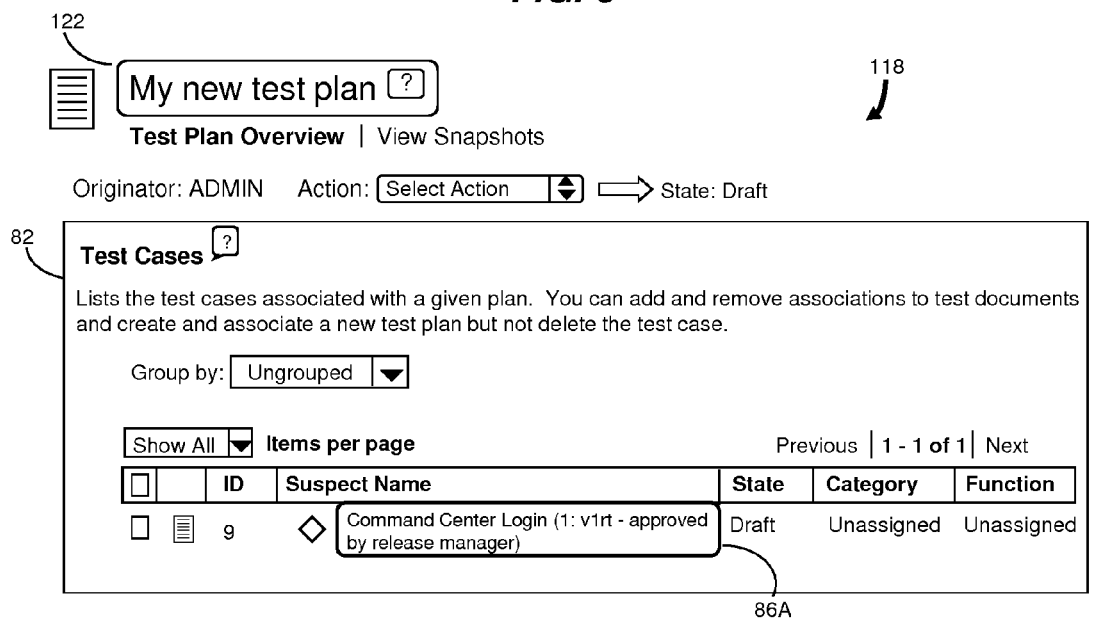
FIG. 7 illustrates a screen shot of a graphical user interface used in the creation of a new test plan.

FIG. 7 shows a screen shot of a GUI 118 used in the creation of a new test plan. The snapshot of the Command Center Login test case shown in FIG. 6 is a reusable test artifact that is used as part of the new test plan 122 named "My new test plan." Instead of making a relationship from this new test plan to the current or HEAD version of the test plan, the test plan is linked to the previously captured snapshot. In effect, the snapshot artifact is linked to a different (new) artifact thereby defining a new relationship while the selected snapshot artifact relationship with the previous test plan is left intact.

While the invention has been shown and described with reference to specific embodiments, it should be understood by those skilled in the art that various changes in form and detail may be made therein without departing from the spirit and scope of the invention.

What is claimed is:

1. A method of managing test artifacts, the method comprising:
    selecting a test plan for a product, the test plan having a plurality of test artifacts comprising one selected from a group consisting of an execution record and a product requirement;
    selecting one of the test artifacts for a snapshot at a current time, wherein the snapshot includes a storage record that includes information associated with the selected one of the test artifacts and a relationship of the selected one of the test artifacts with respect to other test artifacts at the current time;
    acquiring the snapshot of the selected one of the test artifacts, comprising:
        storing a current state of the one selected test artifact as an element of the snapshot;
        storing a current state of relationships of the one selected test artifact to other test artifacts as an element of the snapshot; and
        storing a current state of the other test artifacts having a relationship with the one selected test artifact as an element of the snapshot; and
    determining a type of snapshot of the one selected test artifact by (1) cascading through artifacts of the test plan to capture information associated with the one selected test artifact, child artifacts of the one selected test artifact, and a group consisting of an execution record defining a configuration of the product and product requirements, and (2) capturing the relationship of the one selected test artifact with other test artifacts and the child artifacts.

2. The method of claim 1 wherein selecting one of the test artifacts comprises executing a single user gesture through a user interface.

3. The method of claim 1 further comprising generating a subsequent test plan comprising a plurality of test artifacts, wherein at least one of the test artifacts in the subsequent test plan is specified by a link to the stored current states and stored relationships of the snapshot.

4. The method of claim 1 wherein the selected test artifact further includes at least one of a test case or a test script.

5. The method of claim 4 wherein the test case comprises at least one test artifact having a script for executing a test function.

6. The method of claim 1 further comprising providing a unique name to identify the snapshot.

7. The method of claim 1 wherein the product comprises one of a software product, a hardware product and a combined software and hardware product.

8. The method of claim 1 further comprising reusing the selected test artifact according to the snapshot.

9. A computer program product for managing test artifacts, the computer program product comprising:
  a tangible non-transitory computer readable storage medium having computer readable program code embodied therewith, the computer readable program code comprising:
    computer readable program code configured to generate a user interface displaying at least one test plan having a plurality of test artifacts comprising one selected from a group consisting of an execution record and a product requirement, wherein the user interface enables a user to select one of the displayed test plans;
    computer readable program code configured to enable the user to select one of the plurality of test artifacts associated with the selected one of the displayed test plans;
    computer readable program code configured to acquire a snapshot of the selected one of the plurality of test artifacts, the snapshot including a storage record that includes information associated with the one selected test artifact and a relationship of the one selected test artifact with respect to other test artifacts at a current time,
  wherein acquiring a snapshot comprises:
  storing a current state of the one selected test artifact as an element of the snapshot;
  storing a current state of the relationship of the one selected test artifact to the other test artifacts as an element of the snapshot; and
  storing a current state of the other test artifacts having a relationship with
  the one selected test artifact as an element of the snapshot; and
    computer readable program code configured to determine a type of the acquired snapshot, wherein determining that the type of snapshot is a snapshot of the test plan comprises cascading through artifacts of the test plan to capture all information associated with the one selected test artifact, its child artifacts, and a group consisting of an execution record defining a configuration of the product and a product requirement, and to further capture the one selected test artifact's relationship with other test artifacts and its child artifacts.

10. The computer program product of claim 9 wherein the computer readable program code further comprises computer readable program code enabling the user to generate a subsequent test plan comprising a plurality of test artifacts, wherein at least one of the test artifacts in the subsequent test plan is specified by a link to the stored current states and stored relationships for the snapshot.

11. The computer program product of claim 9 wherein the one selected test artifact further includes at least one of a test case or a test script.

12. The computer program product of claim 9 wherein the test case comprises at least one test artifact having a script for executing a test function.

13. The computer program product of claim 9 wherein the computer readable program code further comprises computer readable program code to enable the user to assign a unique name to identify the snapshot.

14. The computer program product of claim 9 wherein the computer readable program code further comprises computer readable program code configured to reuse the one selected test artifact according to the snapshot.

15. An apparatus for managing test artifacts, comprising:
  a processing unit;
  a user interface including program code executed by the processing unit, the user interface enabling a user to select a test plan for a product, the test plan having a plurality of test artifacts comprising one selected from a group consisting of an execution record and a product requirement, the user interface enabling the user to select one of the test artifacts for which a snapshot is to be acquired, the snapshot including a storage record that includes information associated with the selected one of the test artifacts and a relationship of the selected one of the test artifacts with respect to other test artifacts at a current time;
  a database for storing
    a current state of the one selected test artifact as an element of the snapshot,
    a current state of relationships of the one selected test artifact with respect to other test artifacts as an element of the snapshot, and
    a current state of the other test artifacts that have a relationship with the one selected test artifact as an element of the snapshot
  wherein a type of snapshot is determined with the processing unit by cascading through artifacts of the test plan to capture all information associated with the one selected test artifact, its child artifacts, and a group consisting of an execution record defining a configuration of the product and a product requirement, and to further capture the one selected test artifact's relationship with the other test artifacts and its child artifacts.

16. The apparatus of claim 15 wherein the user interface enables the user to select the test plan using a single user gesture.

17. The apparatus of claim 15 wherein the user assigns a unique name via the user interface and processing unit to identify the snapshot.

18. The apparatus of claim 15 wherein the processing unit further comprises reusing the selected test artifact according to the snapshot.

* * * * *